UNITED STATES PATENT OFFICE 2,355,782

METHOD OF PRODUCING A RESIN ACID LACTONE

Richard F. B. Cox, Wilmington, Del., assignor to Hercules Powder Company, Wilmington, Del., a corporation of Delaware No Drawing. Application July 31, 1942,
Serial No. 453,050

9 Claims. (Cl. 260—97)

This invention relates to an improved process for the preparation of a resin acid lactone. More particularly, it is concerned with an improved method of producing a resin acid lactone from a hydrogenated rosin which contains dihydroabietic acid.

A resin acid lactone having a melting point of about 130–132° C. and having the approximate formula of $C_{20}H_{32}O_2$ has been prepared according to different procedures described in the art. Recently, it was been prepared from a rosin which contains dihydroabietic acid and dehydroabietic acid as constituents by treatment of the rosin with sulfuric acid. Considerable difficulty has been experienced in carrying out this process. A large amount of sulfuric acid is needed to both sulfonate the dehydroabietic acid to a dehydroabietic acid sulfonate and to effect hydration of the dihydroabietic acid to a resin acid lactone. In addition, the recovery of the resin acid lactone in crystalline form was complicated by the presence of the dehydroabietic acid sulfonate. Furthermore, the total time necessary to complete the reaction and recover the crystalline resin acid lactone was in the neighborhood of 24 hours. Only relatively low yields of the product were obtained.

Now, in accordance with this invention it has been found that materially increased yields of a resin acid lactone having a melting point of 130–132° C. and having the approximate formula $C_{20}H_{32}O_2$ may be obtained from hydrogenated rosin which contains dihydroabietic acid by reacting relatively small amounts of sulfuric acid with the hydrogenated rosin in the presence of a solvent in which the resin acid lactone is substantially insoluble. By this method, the time of the reaction is then reduced to about 1 minute to about 1 hour, and in addition the above described resin acid lactone may be directly recovered in crystalline form from the solvent. Thus, in accordance with the improved process of this invention, hydrogenated rosin which contains dihydroabietic acid is treated with concentrated sulfuric acid at a temperature within the range of from about −20° C. to about +50° C., for a period of from about 1 minute to about 1 hour, depending on the efficiency of agitation, in the presence of a solvent in which the resin acid lactone is substantially insoluble and recovering the resin acid lactone from said reaction mixture.

Now having indicated in a general way the nature and purpose of this invention, the following examples are illustrative of the invention and are not to be construed as limiting the same:

Example 1

To 1000 parts of hydrogenated rosin (60% hydrogenated), containing 35% dihydroabietic acid, dissolved in 700 parts of hexane at 15–20° C. were added 275 parts concentrated sulfuric acid, having a specific gravity of 1.84 (97% sulfuric acid) with rapid stirring. The stirring was continued for ½ hour, then 500 parts of ice were added with stirring and the lower dark layer which separated was drawn off. Upon cooling, there were recovered from the hexane solution 236 parts of lactone. The lactone was characterized by being a water-white solid having a melting point of about 130–132° C. and having the approximate formula $C_{20}H_{32}O_2$.

Example 2

To 1000 parts by weight of 59% hydrogenated rosin (A. N. 160.3, M. P. 76.0°, drop), containing 35% dihydroabietic acid, dissolved in 700 parts by weight of hexane, were added 275 parts by weight of concentrated sulfuric acid having a specific gravity of 1.84 (97% sulfuric acid) at 15° C. After stirring for ½ hour, 500 parts by weight chipped ice were stirred in. The lower layer was drawn off and the hexane solution was cooled to crystallize a resin acid lactone. The yield of resin acid lactone was 171 parts by weight. The lactone possessed the same characteristics as that recovered in Example 1.

Example 3

To 1000 parts by weight 59% hydrogenated rosin, containing 35% dihydroabietic acid, dissolved in 700 parts by weight of hexane, were added 275 parts by weight of concentrated sulfuric acid, having a specific gravity of 1.84 (97% sulfuric acid) at 10° C., then 350 parts by weight of hexane and 100 parts by weight of ice were stirred in. The lower layer was drawn off and the hexane layer was cooled. The yield of resin acid lactone was 171 parts by weight. The lactone possessed the same characteristics as those recovered in Example 1.

Example 4

To 1000 parts by weight 59% saturated hydrogenated rosin, containing 35% dihydroabietic acid, in 700 parts by weight hexane, were added 275 parts by weight of concentrated sulfuric acid, having a specific gravity of 1.84 (97% sulfuric acid) at 15° C. After ½ hour stirring, 75 parts by weight of water were added. The lower layer which separated was drawn off. The hexane layer was cooled and a yield of 327 parts by weight of resin acid lactone was recovered. The lactone possessed the same characteristics as those recovered in Example 1.

*Example 5*

Example 4 was repeated and the average yield of resin acid lactone obtained in 8 runs was 274 parts by weight. The lactone possessed the same characteristics as those recovered in Example 1.

*Example 6*

To 1000 parts by weight hydrogenated rosin, containing 35% dihydroabietic acid, and 700 parts by weight of petroleum ether, were added 727 parts by weight of concentrated sulfuric acid, having a specific gravity of 1.84 (97% sulfuric acid) at 30° C. After stirring for 1 hour, 200 parts of water were added, and the lower layer was drawn off. The petroleum ether layer yielded on cooling 268 parts by weight of crystalline lactone. The lactone possessed the same characteristics as those recovered in Example 1.

*Example 7*

Example 6 was repeated using 360 parts by weight of concentrated sulfuric acid, having a specific gravity of 1.84 (97% sulfuric acid). The yield of crystalline lactone was 250 parts by weight. The lactone possessed the same characteristics as those recovered in Example 1.

*Example 8*

Example 6 was repeated using 0° C. for the lactonization temperature. The yield of crystalline lactone was 280 parts by weight. The lactone possessed the same characteristics as those recovered in Example 1.

*Example 9*

Example 6 was repeated using 0.1 hour for the time of reaction with the concentrated sulfuric acid. The yield of crystalline lactone was 236 parts by weight. The lactone possessed the same characteristics as those recovered in Example 1.

*Example 10*

Example 9 was repeated using 185 parts by weight of concentrated sulfuric acid, having a specific gravity of 1.84 (100% sulfuric acid). The yield of lactone was 270 parts by weight.

Concentrated sulfuric acid of a specific gravity of about 1.84 has been used in the examples. This is used for purposes of illustration only. The sulfuric acid which is operable for carrying out the invention must be of a specific gravity of at least 1.78. Monohydrate of sulfuric acid or mixtures is equally operable. The amount of sulfuric acid may vary. It has been found, however, that by using from about 1–4 mols for each of the double bonds present in the rosin acid excellent results will be obtained. The amount of concentrated sulfuric acid will vary with the acids present in the hydrogenated rosin. For example, tetrahydro-resin acids do not inactivate sulfuric acid and act only as a diluent, but abietic acid can ake up 2 mols of sulfuric acid and render it inactive as a catalyst. Pure dihydroabietic acid can take up 1 mol of sulfuric acid, but the sulfuric acid is rendered active again by elimination from the resin acid molecule when lactone formation begins. It will be understood, however, if desired, a larger amonnt of sulfuric acid may be used as it can be easily and readily recovered. By the term "concentrated sulfuric acid" as used in the specification and claims is meant a sulfuric acid having a specific gravtiy of at least 1.78 and containing from 80–100% acid.

The solvent for the sulfonation may be a petroleum hydrocarbon low in benzenoid and unsaturated constituents such as butane, pentane, hexane, heptane, etc., gasoline, and the like. Other suitable solvents may be used which are solvents for the rosin, and in which the resin acid lactone is substantially insoluble, and in which the lactone crystallizes when released from the sulfuric acid by the addition of water. The amount of water to be added to the reaction mixture may vary. Care should be taken, however, that the amount is not so large as to leave sludge in the hexane layer as well as not small enough to allow some of the sulfuric acid to remain in solution.

In carrying out the process of this invention, hydrogenated rosin which contains dihydroabietic acid, preferably from about 20% to 100% is treated with concentrated sulfuric acid in an amount preferably from about 1 mol to 4 mols for each double bond present in the rosin acid depending on the acids present in the hydrogenated rosin. A solvent is added to the reaction mixture. It is desired that the solvent be one in which resin acid lactone is substantially insoluble so that the crystalline lactone can be directly recovered from the solution. The reaction may be carried out at a temperature within the range of from about −20° C. to about +50° C., but preferably from about +10° C. to about +20° C., for a period of time which may vary from about 1 minute to about 1 hour, depending on the efficiency of agitation, but is preferably from about 2 minutes to about 30 minutes. Ice or water may be added to the reaction mixture after the reaction is complete. This will cause a separation of the sulfuric acid and the resin acid lactone in the solvent. The lower layer containing the sulfuric acid may be drawn off and the crystalline lactone directly recovered from the solution. Other suitable methods for the recovery of the crystalline lactone from the reaction mixture may be used if so desired.

The resin acid lactone produced by this invention is characterized by being a water-white solid having a melting point of about 130–132° C. and having the approximate formula of $C_{20}H_{32}O_2$.

It has been found that materially increased yields of the above-described resin acid lactone are obtained from a hydrogenated rosin which contains dihydroabietic acid by reacting relatively small amounts of sulfuric acid with the rosin in the presence of a solvent. The lactone may be readily converted by saponification to hydroxytetrahydroabietic acid which is valuable as a non-oxidizing soap constituent, and for many other uses.

What I claim and desire to protect by Letters Patent is:

1. A process of producing a resin acid lactone which comprises treating a rosin which contains dihydroabietic acid with concentrated sulfuric acid, at a temperature within the range of from about −20° C. to about +50° C. for a period of from about 1 minute to about 1 hour, in the presence of a solvent in which said resin is soluble and in which said resin acid lactone is substantially insoluble, adding water in an amount sufficient to remove the sulfuric acid from the solution and recovering a resin acid lactone from the mixture.

2. A process of producing a resin acid lactone which comprises treating a rosin which contains dihydroabietic acid with concentrated sulfuric acid, at a temperature with the range of from about —20° C. to about +50° C. for a period of from about 2 minutes to about 30 minutes, in the presence of a solvent in which said rosin is soluble and in which said resin acid lactone is substantially insoluble, adding water in an amount sufficient to remove the sulfuric acid from the solution and recovering a resin acid lactone from the mixture.

3. A process of producing a resin acid lactone which comprises treating a rosin which contains dihydroabietic acid with concentrated sulfuric acid, at a temperature with the range of from about +10° C. to about +20° C. for a period of from about 2 minutes to about 30 minutes, in the presence of a solvent in which said rosin is soluble and in which said resin acid lactone is substantially insoluble, adding water in an amount sufficient to remove the sulfuric acid from the solution and recovering a resin acid lactone from the mixture.

4. A process of producing a resin acid lactone which comprises treating a rosin which contains from about 20% to 100% dihydroabietic acid with concentrated sulfuric acid, at a temperature within the range of from about —20° C. to about +50° C. for a period of from about 2 minutes to about 30 minutes, in the presence of a solvent in which said rosin is soluble and in which said resin acid lactone is substantially insoluble, adding water in an amount sufficient to remove the sulfuric acid from the solution and recovering a resin acid lactone from the mixture.

5. A process of producing a resin acid lactone which comprises treating a rosin which contains from about 20% to 100% dihydroabietic acid with from about 1 mol to 4 mols of concentrated sulfuric acid, at a temperature within the range of from about —20° C. to about +50° C. for a period of from about 2 minutes to about 30 minutes, in the presence of a solvent in which said rosin is soluble and in which said resin acid lactone is substantially insoluble, adding water in an amount sufficient to remove the sulfuric acid from the solution and recovering a resin acid lactone from the mixture.

6. A process of producing a resin acid lactone which comprises treating a rosin which contains from about 50% to about 75% dihydroabietic acid with from about 1 mol to 4 mols of concentrated sulfuric acid, at a temperature within the range of from about —20° C. to about +50° C. for a period of from about 2 minutes to about 30 minutes, in the presence of a solvent in which said rosin is soluble and in which said resin acid lactone is substantially insoluble, adding water in an amount sufficient to remove the sulfuric acid from the solution and recovering a resin acid lactone from the mixture.

7. A process of producing a resin acid lactone which comprises treating a rosin which contains dihydroabietic acid with from about 1 mol to 4 mols of concentrated sulfuric acid, at a temperature within the range of from about —20° C. to about +50° C. for a period of from about 1 minute to about 1 hour, in the presence of a solvent in which said rosin is soluble and in which said resin acid lactone is substantially insoluble, adding water in an amount sufficient to remove the sulfuric acid from the solution and recovering a resin acid lactone from the mixture.

8. A process of producing a resin acid lactone which comprises treating a rosin which contains dihydroabietic acid with from about 1 mol to 4 mols of concentrated sulfuric acid, at a temperature within the range of from about +10° C. to about +20° C. for a period of from about 1 minute to about 1 hour, in the presence of a solvent in which said rosin is soluble and in which said resin acid lactone is substantially insoluble, adding water in an amount sufficient to remove the sulfuric acid from the solution and recovering a resin acid lactone from the mixture.

9. A process of producing a resin acid lactone which comprises treating a rosin which contains dihydroabietic acid with from about 1 mol to 4 mols of concentrated sulfuric acid, at a temperature within the range of from about +10° C. to about +20° C. for a period of from about 2 minutes to amout 30 minutes, in the presence of a solvent in which said rosin is soluble and in which said resin acid lactone is substantially insoluble, adding water in an amonut sufficient to remove the sulfuric acid from the solution and recovering a resin acid lactone from the mixture.

RICHARD F. B. COX.